T. E. BARNUM.
MOTOR CONTROLLER.
APPLICATION FILED JUNE 1, 1909.
1,016,060.
Patented Jan. 30, 1912.
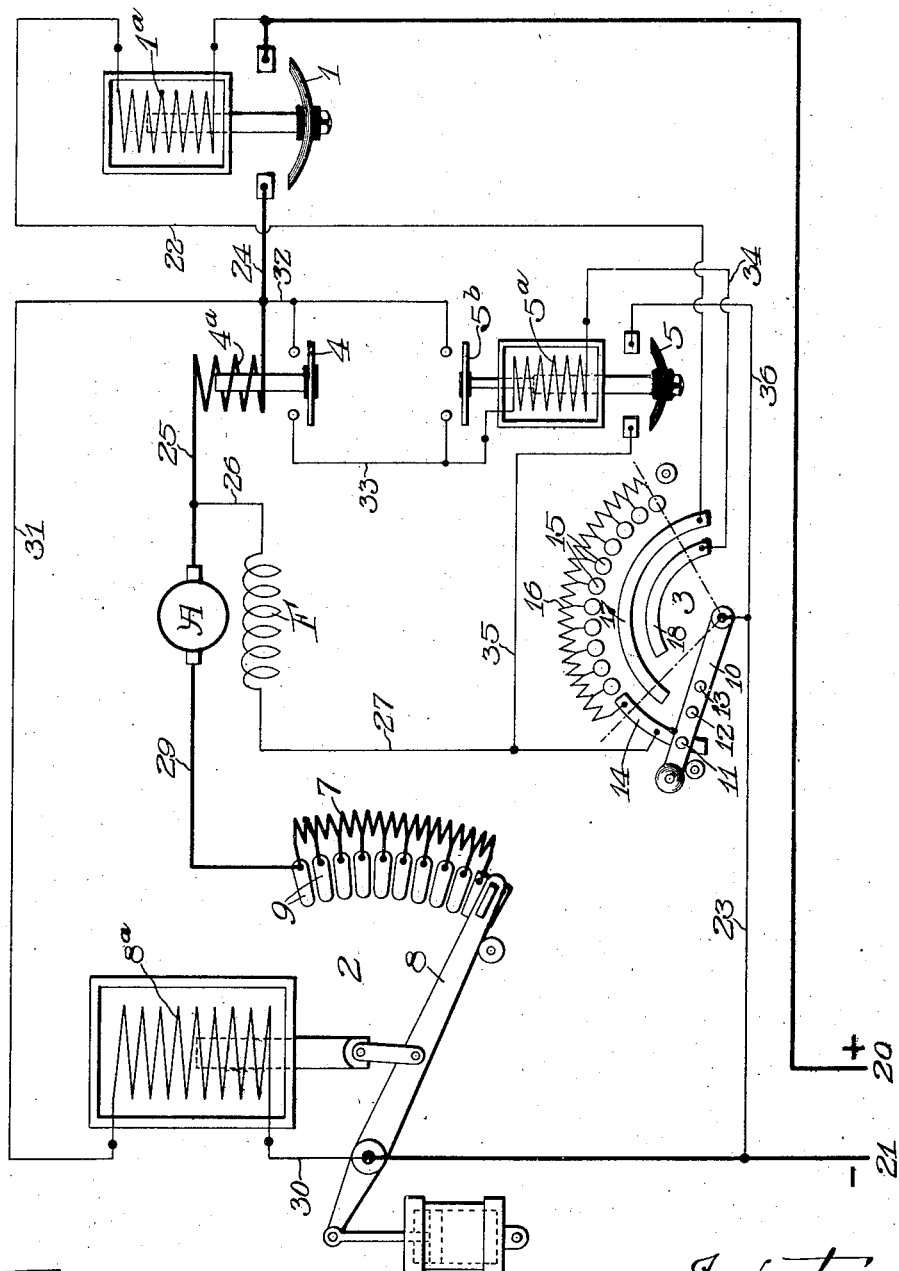

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,016,060.  Specification of Letters Patent.  Patented Jan. 30, 1912.

Application filed June 1, 1909. Serial No. 499,423.

*To all whom it may concern:*

Be it known that I, THOMAS E. BARNUM, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in controllers for electric motors and more particularly to controllers for motors, the speed of which may be regulated by varying the field strength thereof. Where such motors are used for operating centrifugal pumps, force fans and other devices working against an opposing pressure or head, if such pressure or head decreases abnormally, the motor becomes overloaded. To protect the motor under such conditions, it is necessary to reduce the speed thereof. This may be accomplished by strengthening the field of the motor, thereby reducing the speed and relieving the same of its excessive load without interrupting the supply of water or air from the pump or fan.

My invention, therefore, has for its object to provide means for automatically increasing the field strength of the motor to decrease the speed and thus protect the same upon an abnormal increase in its load.

A further object of my invention is to provide means whereby, after the protecting means has once responded, the field strength of the motor cannot be again decreased until the field regulating device has first been returned to initial position.

Various other objects and adavantages of my invention will be hereinafter set forth.

In order to more clearly disclose the characteristic features of my invention, I shall describe the system of control illustrated in the accompanying drawing.

The drawing illustrates a very simple system of control embodying my invention in one form.

It should, of course, be understood that my invention is capable of various modifications.

The controller illustrated includes a main switch 1, an accelerating device 2, a field regulating device 3, and switches 4 and 5 which, as will be hereinafter set forth, cooperate to protect the motor upon the same becoming overloaded. The motor illustrated is of the plain shunt wound type, being provided with an armature A and a shunt field winding F. The continuity of the motor circuit is controlled by the main switch 1, which is provided with an operating winding $1^a$. Included in the motor circuit is an armature resistance 7 which is controlled by the device 2. As illustrated, the device 2 merely comprises a pivoted member 8, having an operating winding $8^a$. The member 8 is adapted to be moved by its operating winding over a series of contacts 9 to gradually remove the resistance 7 from the motor circuit. The device 3, as illustrated, includes a movable element 10, carrying three contact brushes 11, 12 and 13. In initial position, as shown in the drawing, the brush 11 engages a contact segment 14. When the member 10 is moved to the right from initial position, the brush 11 passes off of the contact segment 14, and, upon continued movement of the arm 10, sweeps over a series of contacts 15 which are connected to a field resistance 16. Also, when the arm is moved from initial position, the brushes 12 and 13 are moved into engagement with contact segments 17 and 18 respectively, the purpose of which will be hereinafter set forth. Switch 4 has an operating winding $4^a$ connected in series with the motor armature and is, therefore, responsive to the armature current. This winding is preferably adjusted to respond only when there is an abnormal flow of current through the motor armature. The switch 5 is provided with an operating winding $5^a$ which, as will be hereinafter set forth, is controlled by the switch 4. The plunger of the winding $5^a$ is preferably arranged to also operate a contact disk $5^b$, the purpose of which will be hereinafter set forth.

I shall now explain the operation of the controller, at the same time clearly setting forth the circuit connections. Assuming the several switches to be in the position illustrated, no current will flow through the motor or through any of the operating windings from the main lines 20 and 21. To start the motor, it is necessary to move the arm of the regulating device into such a position that the brush 12 thereof will engage the contact segment 17. This closes a circuit from main line 20 through the operating winding 1ª of the main switch by conductor 22 to the segment 17, thence through arm 10, and by conductor 23 to the negative side of the main line. This causes the energization of the winding 1ª, which thereupon closes the main switch 1.

While I have shown the main switch as controlled from the field regulating device, it should be understood that I might provide an independent controlling switch therefor of any preferred type. Closure of the switch 1 completes the circuits of both the motor armature and shunt field winding. The circuit for the latter may be traced from main line 21, through the switch 1, by conductor 24 through the operating winding of 4ª of the switch 4, by conductors 25 and 26, through the field winding F, by conductor 27 to contact segment 14 of the regulating device, thence through the arm 10 thereof to the negative side of the main line. The armature circuit may be traced from conductor 25, through the armature A, by conductor 29, through the resistance 7 and arm 8 of the starting device, to the negative side of the main line. The motor is thus started with all of the starting resistance 7 in circuit and with a full strength field. Upon closure of the main switch 1, a circuit is also completed from conductor 24, by conductor 31, through the operating winding 8ᵉ of the starting device 8, by conductor 30 to main line 21. The winding 8ª thereupon becomes energized and operates the member 8 to gradually remove the starting resistance from circuit to bring the motor up to speed. To increase the speed of the motor, the member 10 of the regulating device may be moved so as to cause the brush 11 thereof to pass onto the contacts 15, thereby inserting resistance in the field circuit of the motor. Of course, the amount of resistance included in the field circuit determines the speed of the motor. When the desired amount of resistance has been inserted in the field circuit of the motor, the member 10 may be left without further attention. Assuming that the motor is operating a device working against a predetermined pressure or head, the speed of the motor should be regulated in accordance with the work to be performed. If the pressure against which the motor is operated remains constant within predetermined limits, the motor will operate with perfect safety. On the other hand, if the head against which the motor operates decreases abnormally, the demand on the motor will be increased, thereby overloading the same. This results in causing an abnormal flow of current through the motor, which causes the switch 4 to respond. Closure of the switch 4 completes a circuit from conductor 24, by conductor 32, through the switch 4, by conductor 33, through the operating winding 5ª of the switch 5, by conductor 34 to contact segment 18 of the regulating device, thence through the member 10 thereof to the negative side of the main line. This causes the energization of the winding 5ª which thereupon closes the switch 5. Closure of the switch 5 completes a circuit in parallel to the resistance included in the field circuit. This parallel circuit may be traced from conductor 27, by conductor 35, through the switch 5, by conductor 36 to conductor 23.

The circuit just traced has very low resistance, and, in consequence, short-circuits all of the resistance included in the field circuit of the motor. This, of course, restores full strength to the field winding of the motor, thereby decreasing the speed thereof. The decrease in the speed of the motor rectifies the abnormal conditions set up by overloading the motor and permits the motor to thereafter operate with perfect safety, and without interrupting the flow of water or air from the pump or fan operated by the motor. Of course, as soon as normal conditions are restored in the motor, the switch 4 will be released, thereby tending to open the circuit of the winding 5ª. The winding 5ª would thereupon release the switch 5 which would result in opening the short-circuit around the field resistance. Of course, if the pressure against which the motor was operated was restored to normal value, the motor could then return to maximum speed with safety. On the other hand, if the pressure remains abnormally low, then, upon the removal of the short-circuit around the field resistance, the motor would immediately become overloaded again. This would cause the switches 4 and 5 to operate in the manner previously set forth. Therefore, I preferably provide means whereby, when the protecting means have once responded, the short-circuit around the field resistance will be maintained until the member 10 of the regulating device is moved toward initial position. This result is accomplished in the present instance by the contact 5ᵇ operated by the switch 5. When the switch 5 closes, the contact 5ᵇ completes a circuit in parallel with the overload switch 4, thereby enabling the switch 4 to open without interrupting the circuit of the operating winding of the switch 5. Hence, after the switch 5 has once been closed, it will remain in closed position until the member 10 of the regulating device is moved to disengage the brush 13 thereof from the contact segment 18.

Having thus described my invention, what I claim as new and desire to secure by Letters Patent, is:—

1. In a controller for electric motors, in combination, means for decreasing the field strength of the motor to increase the speed thereof, and means operable independently of said first mentioned means for automatically increasing the field strength of the motor upon an abnormal increase in the load thereon to cause the motor to operate at a decreased speed.

2. In a controller for electric motors, in combination, a field regulating device adapted to vary the field strength of the motor to increase the speed thereof, means for automatically increasing the field strength of the motor upon an abnormal increase in the load thereof to cause the motor to operate at a decreased speed, and means necessitating the return of said regulating device toward initial position prior to the acceleration of the motor after the operation of said first mentioned means.

3. In a controller for electric motors, in combination, a resistance adapted to be included in the field circuit of the motor to increase the speed thereof, a plurality of separately actuated controlling means for said resistance, one for automatically removing said resistance from the field circuit upon an abnormal increase in the load on the motor to cause the motor to operate at a decreased speed.

4. In a controller for electric motors, in combination, a variable resistance included in the field circuit of the motor to increase the speed thereof, means for varying said resistance at will; and separately actuated means for automatically short-circuiting said resistance from the field circuit upon an abnormal increase in the load on the motor to cause the motor to operate at a decreased speed.

5. In a controller for electric motors, in combination, a variable resistance, a controlling element adapted to insert said resistance in the field circuit of the motor, means for short-circuiting the resistance included in the field circuit of the motor upon an abnormal increase in the load thereof to cause the motor to operate at a decreased speed, and means necessitating the return of said element to a predetermined position prior to the insertion of said resistance in the field circuit after said first mentioned means has once operated.

6. In a controller for electric motors, in combination, means for gradually decreasing the field strength of the motor to increase the speed thereof, and electroresponsive means responsive to abnormal conditions in the motor circuit for automatically and quickly increasing the field strength of the motor to decrease the speed thereof.

7. In a controller for electric motors in combination, means for decreasing the field strength of the motor to increase the speed of the motor, normally inoperative means adapted upon operation to increase the field strength of the motor for protection of the motor and an electroresponsive device responsive to abnormal current conditions in the motor circuit for rendering said second mentioned means operative.

8. In a controller for electric motors, in combination, means for decreasing the field strength of the motor to increase the speed thereof, an electroresponsive switch having an operating winding responsive to an excessive flow of current through the motor, and electroresponsive means controlled by said switch for increasing the field strength of the motor to decrease the speed thereof.

9. In a controller for electric motors, in combination, a resistance adapted to be included in the field circuit of the motor to increase the speed thereof, an electroresponsive switch having an operating winding responsive to an excessive flow of current through the motor, and electroresponsive means controlled by said switch for removing said resistance from the field circuit of the motor to decrease the speed thereof.

10. In a controller for electric motors, in combination, a resistance, a controlling element adapted to insert said resistance in the field circuit of the motor to increase the speed thereof, an electroresponsive switch having an operating winding responsive to excessive surges of current through the motor armature, electroresponsive means controlled by said switch for short-circuiting the resistance included in the field circuit to decrease the speed of the motor, and automatic means for maintaining said electroresponsive means energized after the same has responded until said resistance controlling element is moved into a predetermined position.

11. In a controller for electric motors, in combination, a variable resistance connected in circuit with the motor armature, an electroresponsive controlling device for said resistance, a variable resistance connected in circuit with the shunt field winding of the motor, a single controlling element for said electroresponsive device and said shunt field resistance, said element being adapted when operated to first energize said electroresponsive device and then gradually insert said shunt field resistance to increase the speed of the motor and electroresponsive means adapted to respond upon an abnormal increase in the load on the motor to decrease the shunt field resistance to cause the motor to operate at a decreased speed until said controlling element has been operated to reinsert said shunt field resistance in circuit.

12. In a controller for electric motors, in combination, a variable resistance connected in circuit with the motor armature, an electroresponsive controlling device for said resistance, a variable resistance connected in circuit with the shunt field winding of the motor, a single controlling element for said electroresponsive device and said shunt field resistance, said element being adapted when operated to first energize said electroresponsive device and then gradually insert said shunt field resistance to increase the speed of the motor and electroresponsive means adapted to respond upon an abnormal increase in the load on the motor to decrease the shunt field resistance to cause the motor to operate at a decreased speed until said controlling element has been operated to reinsert said shunt field resistance in circuit, said element being operable to again accelerate the motor by shunt field regulation after the occurrence of an over-load without affecting the armature circuit of the motor.

In witness whereof, I have hereunto subscribed my name in the presence of two witnesses.

THOMAS E. BARNUM.

Witnesses:
 FRANK H. HUBBARD,
 WALTER E. SARGENT.